United States Patent [19]
Cohen et al.

[11] 4,153,865
[45] May 8, 1979

[54] DYNAMICALLY COMPENSATED SERVO MONITOR

[75] Inventors: Richard L. Cohen, Matawan; Richard J. Anderson, Fairfield, both of N.J.

[73] Assignee: The Bendix Corporation, Teterboro, N.J.

[21] Appl. No.: 810,212

[22] Filed: Jun. 27, 1977

[51] Int. Cl.² ............................................. G05B 23/02
[52] U.S. Cl. .................................... 318/565; 318/616
[58] Field of Search .............. 318/565, 564, 616, 618, 318/632, 563

[56] References Cited
U.S. PATENT DOCUMENTS

| | | | |
|---|---|---|---|
| 3,135,485 | 6/1964 | Miller | 318/565 |
| 3,252,675 | 5/1966 | Close et al. | 318/565 |
| 3,493,836 | 2/1970 | Nelson | 318/565 |

Primary Examiner—Gene Z. Rubinson
Assistant Examiner—Eugene S. Indyk
Attorney, Agent, or Firm—Anthony F. Cuoco

[57] ABSTRACT

Apparatus for use with a rate feedback controlled servo monitor system maintains close static monitor tolerances under dynamic conditions by using the rate feedback to compensate for the velocity lag error component of the monitor tolerance.

5 Claims, 2 Drawing Figures

DYNAMICALLY COMPENSATED SERVO MONITOR

BACKGROUND OF THE INVENTION

1. Field of the Invention

This invention relates generally to monitored servo systems and particularly to dynamically controlled monitors for servo systems. More particularly, this invention relates to apparatus for maintaining a close static monitor tolerance under dynamic conditions.

2. Description of the Prior Art

In servo systems incorporating monitoring apparatus, the tolerance of the monitoring apparatus is equal to the static offset error plus the velocity lag error of the system. Prior to the present invention the tolerance of the monitoring apparatus, i.e., the failure detection sensitivity of the apparatus, was set wide enough to accommodate the velocity lag error component in order to forestall nuisance failure alarms under dynamic conditions. However, this desensitizes the monitoring apparatus under static conditions, and in many applications such desensitization cannot be tolerated. The present invention overcomes this disadvantage by using rate feedback to compensate for the velocity lag error component, whereby the tolerance of the monitoring apparatus can be held closer than has heretofore been possible in order to achieve the required static sensitivity.

SUMMARY OF THE INVENTION

This invention contemplates dynamically controlled servo monitoring apparatus whereby rate feedback is used to approximately compensate for the velocity lag error component of the monitoring apparatus tolerance. A servo error signal and a rate feedback signal are applied to an amplifier having a gain in accordance with the velocity lag error and the rate feedback signal to effect the velocity lag error compensation. The amplifier output is applied to an indicator or other like device to provide the monitoring function.

One object of this invention is to provide monitoring apparatus for a servo system, wherein a close static tolerance without nuisance alarms under dynamic conditions is maintained.

Another object of this invention is to maintain close static tolerances by approximately compensating for the velocity lag error component of the monitoring apparatus tolerance.

Another object of this invention is to use rate feedback to compensate for the velocity lag error component of the monitoring apparatus tolerance.

Another object of this invention is to provide a servo monitor of the type described which is not unduly desensitized under static conditions.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
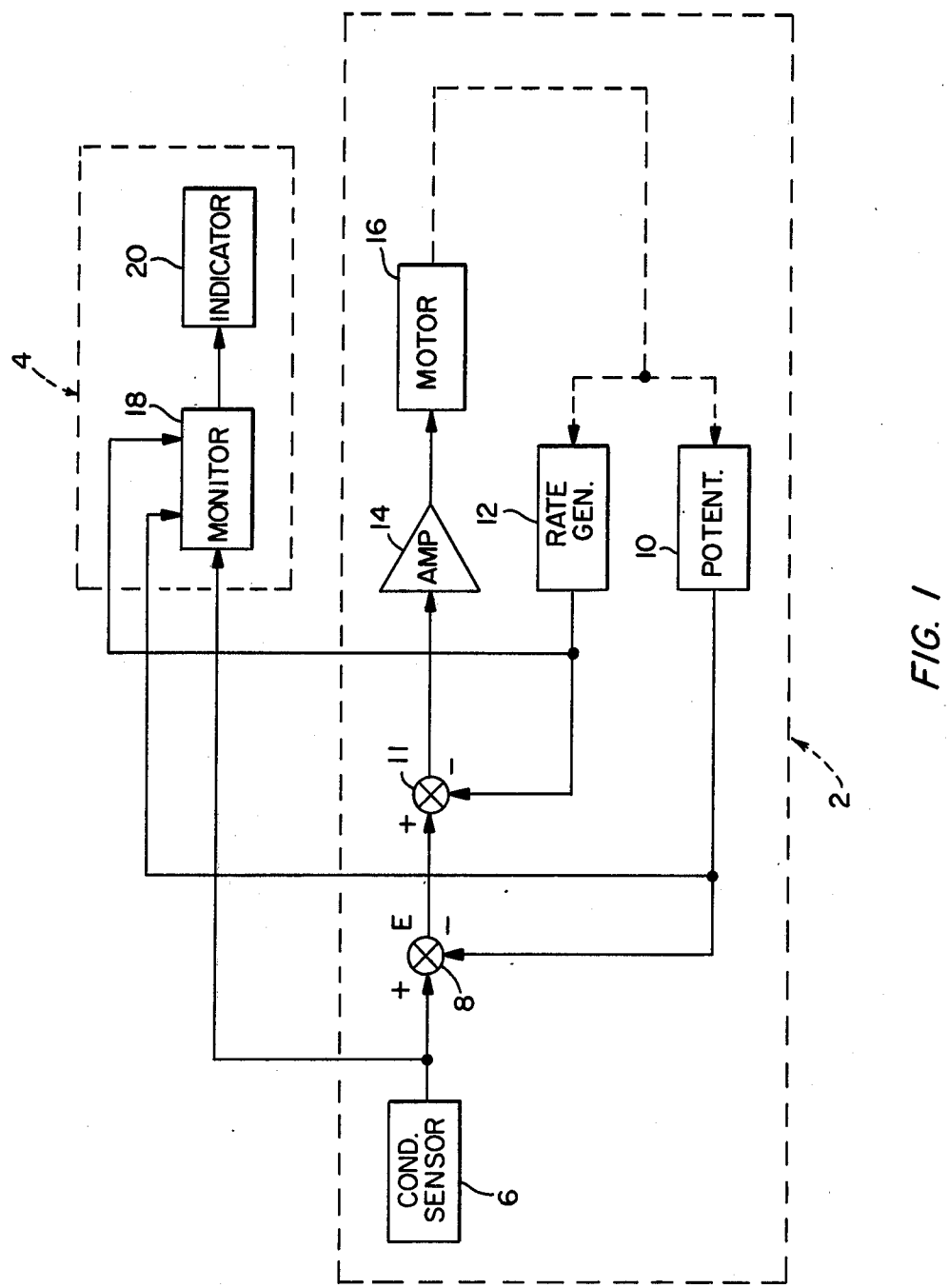
FIG. 1 is a block diagram showing a servo system and showing generally monitoring apparatus therefor in a structural arrangement according to the invention.

With reference to FIG. 1, a servo system is shown and designated by the numeral 2, while monitoring apparatus for the servo system is shown generally and designated by the numeral 4.

Servo system 2 includes a condition sensor 6 which may be, for purposes of illustration, a flight condition sensor which senses a condition for manual or automatic control of an aircraft or a condition relating to aircraft engine performance. In this connection it is noted that servo system 2 is illustrative of a servo type aircraft instrument as is well known in the art.

Condition sensor 6 provides a command signal corresponding to the sensed condition. The signal is applied to a summing means 8, which may be a conventional summing amplifier, and summed thereby with a position feedback signal from a potentiometer 10 to provide an error signal designated as E.

Error signal E is applied to a summing means 11, which is similar to summing means 8, and summed thereby with a rate feedback signal from a rate generator 12. The output from summing means 11 is applied to a servo amplifier 14 and therefrom to a servo motor 16 which is connected by suitable mechanical means to potentiometer 10 and rate generator 12 for driving the potentiometer and rate generator.

The aforenoted description is that of a typical servo system which will be recognized as well known in the art.

The signal from condition sensor 6 is applied to a monitor 18 in monitoring apparatus 4, as is the signal from potentiometer 10 and the signal from rate generator 12. Monitor 18 is responsive to the applied signals and provides a monitoring signal which is applied to an indicator 20, or other like device, for indicating the "good" or "fail" status of servo system 2 as will be hereinafter described.

Figure 2:
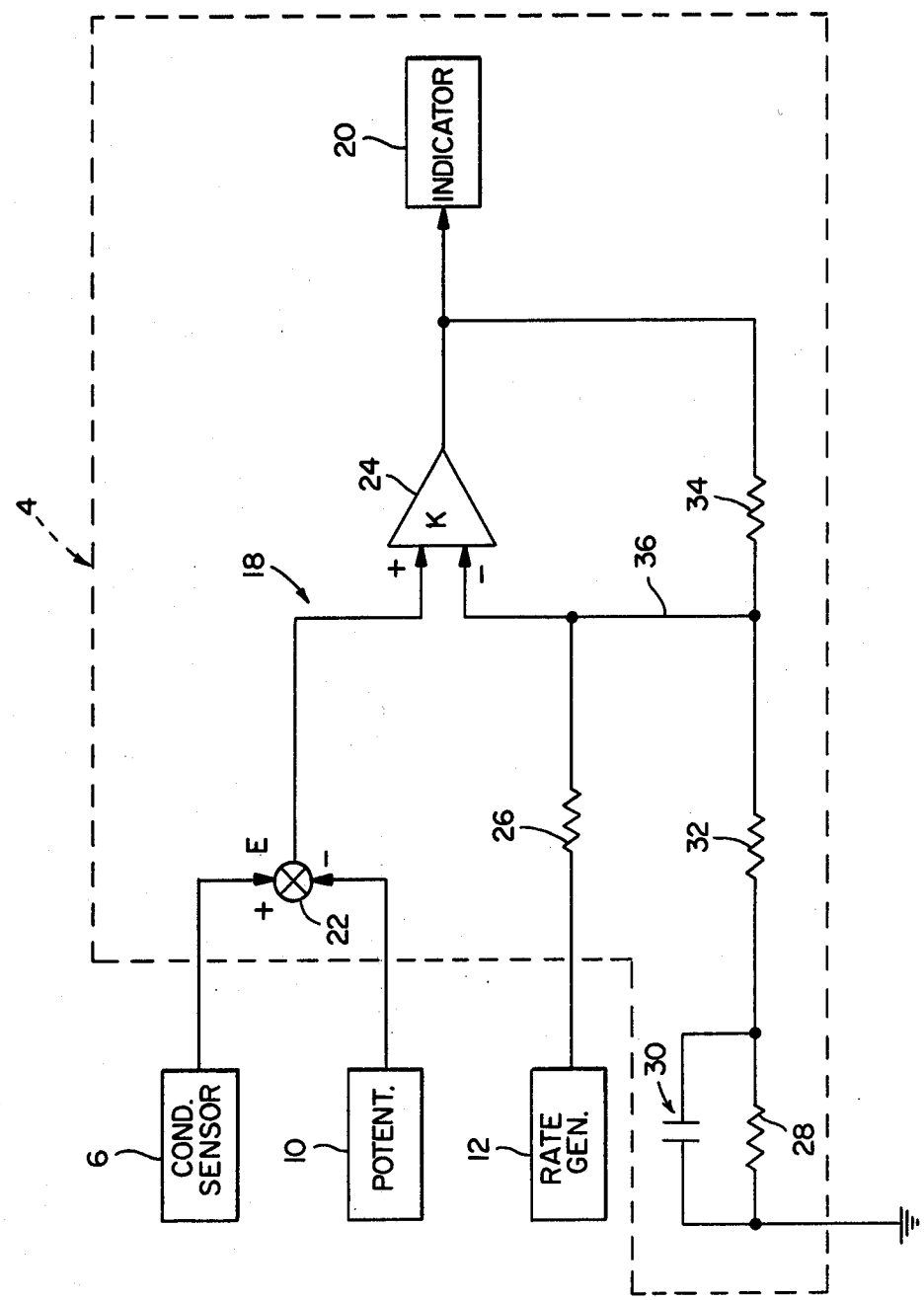
FIG. 2 is a combination block diagram-electrical schematic showing the specific structrual configuration of the monitoring apparatus shown generally in FIG. 1.

FIG. 2 shows the components included in monitor 18 and the specific connections thereto from condition sensor 6, potentiometer 10 and rate generator 12 in servo system 2. Thus, the signal from conditioner sensor 6 and the signal from potentiometer 10 are applied to a summing means 22, and which summing means provides summation signal E. In this connection, it is noted that summing means 22 and summing means 8 shown in FIG. 1 are identical and perform the same function and, indeed, provide the same summation signal E. Two such summing means are used in the invention to provide a degree of the redundancy so that a failure, for example, in servo system summing means 8 will not affect the operation of monitor summing means 22, although it will be understood that except for this reason only one such summing means need be used, the same being within the scope of the invention.

The output from summing means 22 is applied to a noninverting input terminal (+) of an amplifier 24 and the output from rate generator 12 is applied through a scaling resistor 26 to an inverting input terminal (−) of amplifier 24. Amplifier 24 has a gain K which is established as will be hereinafter explained.

Monitor 18 further includes a filter circuit including a resistor 28 and a capacitor 30 connected in parallel relation to each other and connected to ground. The output of the filter circuit is connected to a voltage divider including resistors 32 and 34. A conductor 36 is connected intermediate resistors 32 and 34 and is connected to resistor 26, and which resistor 26 is connected to the inverting input terminal (−) of amplifier 24 as heretofore noted. The output terminal of amplifier 24 is connected to indicator 20 in monitoring apparatus 4.

OPERATION OF THE INVENTION

In a servo system such as servo system 2, as shown and described with reference to FIG. 1, the servo error at any dynamic rate includes a static offset error and a velocity lag error. One way of preventing nuisance failures under dynamic conditions from being indicated by monitoring apparatus 4 is to set the tolerance of monitor 18 to the sum of the static offset error and the velocity lag error. However, this has the effect of desensitizing the monitor under static conditions and, in many applications, such desensitization cannot be tolerated. The present invention overcomes this disadvantage by maintaining a close static tolerance without nuisance failure indications under dynamic conditions by using rate feedback to approximately compensate for the velocity lag error component of the monitor tolerance as shown structurally with reference to FIG. 2 and analytically as follows:

$$V_{LE} = K_f D / K_o$$

Where
  $V_{LE}$ = Velocity Lag Error
  $K_f$ = Rate Feedback Gain
  D = The Rate Output of Rate Generator 12; and
  $K_o$ = The Open Loop Gain of the System For purposes of illustration, it will be assumed that the parameters of the circuitry as shown in FIG. 2 are such that the velocity lag error equals 0.330 volts.

It is further assumed that potentiometer 10 is excited by a 10,000 millivolt source and has a resolution of 1/4,000; thus, the potentiometer can resolve any change in its input signal in 2.5 millivolt steps, i.e., 10,000/4,000 = 2.5 millivolts.

If the speed of rate generator 12 is considered to be 0.21 rpm and the rate generator has a maximum output of 1.25 volts, the rate generator output voltage is 0.260 volts, i.e., 1.25×21=0.260 volts. It will then be seen that the required gain K for amplifier 24 is the quotient of 0.330 divided by 0.260 or 1.27.

Thus, given the premise that the servo error at any dynamic rate is equal to the static offset plus the velocity lag error, the structural arrangement shown in FIG. 2 uses rate feedback to approximately compensate for the velocity lag error, whereby monitor 18 maintains a close static tolerance under dynamic conditions without nuisance failure indications provided by indicator 20.

Although a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In monitoring apparatus for a servo system wherein the tolerance of the monitoring apparatus corresponds to the static offset error and the velocity lag error of the system, means for dynamically compensating the monitoring apparatus for the velocity lag error comprising;
    means for providing a command signal;
    means for providing a position feedback signal;
    means for combining the command and position feedback signals for providing an error signal;
    means for providing a rate feedback signal; and
    the monitoring apparatus including means responsive to the error signal and the rate feedback signal for providing a monitoring signal which is compensated for the velocity lag error, said means including an amplifier having an inverting input terminal, a non-inverting input terminal and an output terminal, the means for combining the command and position feedback signals for providing an error signal connected to the amplifier non-inverting input terminal, the means for providing a rate feedback signal connected to the amplifier inverting input terminal, and the amplifier responsive to the error signal and the rate feedback signal and having a predetermined gain in accordance with the quotient of the velocity lag error divided by the rate feedback means signal for providing at the amplifier output terminal the monitoring signal which is compensated for the velocity lag error.

2. Means as described by claim 1, wherein the means for combining the command and position feedback signals for providing an error signal includes:
    means for summing the command and position feedback signals.

3. Means as described by claim 1, including: voltage divider means connected intermediate the rate feedback means and the amplifier output terminal.

4. Means as described by claim 3 including: filter means connected to the voltage divider means.

5. Means as described by claim 1, including: utilizing means connected to the amplifier output terminal for utilizing the monitoring signal which is compensated for the velocity lag error provided at the amplifier output terminal.

* * * * *